(12) United States Patent
Koenig

(10) Patent No.: US 7,597,138 B1
(45) Date of Patent: Oct. 6, 2009

(54) GROUND WATER HEAT TRANSFER SYSTEMS AND DEPLOYMENT THEREOF

(75) Inventor: Albert A. Koenig, Coatesville, PA (US)

(73) Assignee: American Refining Group, Inc., West Conshohocken, PA (US)

( * ) Notice: Subject to any disclaimer, the term of this patent is extended or adjusted under 35 U.S.C. 154(b) by 329 days.

(21) Appl. No.: 11/657,482

(22) Filed: Jan. 25, 2007

Related U.S. Application Data

(60) Provisional application No. 60/761,795, filed on Jan. 25, 2006.

(51) Int. Cl.
*E21B 36/00* (2006.01)
(52) U.S. Cl. .................................. 166/62; 166/302
(58) Field of Classification Search ............. 166/302, 166/57, 62
See application file for complete search history.

(56) References Cited

U.S. PATENT DOCUMENTS

| | | | |
|---|---|---|---|
| 2,461,449 A | 2/1949 | Smith et al. | |
| 2,637,531 A * | 5/1953 | Davidson | .............. 165/45 |
| 2,914,124 A * | 11/1959 | Ripley, Jr. | ............. 166/57 |
| 4,448,237 A | 5/1984 | Riley | |
| 4,461,157 A | 7/1984 | Shapess | |
| 4,483,318 A | 11/1984 | Margen | |
| 4,790,375 A * | 12/1988 | Bridges et al. | ............. 166/60 |
| 5,183,100 A | 2/1993 | Harrell, Jr. | |
| 6,925,830 B2 | 8/2005 | Xu | |
| 2004/0206085 A1 | 10/2004 | Koenig et al. | |
| 2006/0101820 A1 | 5/2006 | Koenig et al. | |

* cited by examiner

*Primary Examiner*—William P Neuder
(74) *Attorney, Agent, or Firm*—Duane Morris LLP

(57) ABSTRACT

The present invention features ground water heat transfer systems utilizing polypipes. A typical system of the invention comprises (1) a water pump which is suspended or affixed in a deep well and connected to at least one inlet polypipe, where the inlet polypipe(s) is extended to the bottom of the well and comprises a bottom portion including one or more openings; (2) a heat exchange system connected to the water pump; and (3) a return pipe connected to the heat transfer system and having an outlet extending below the water level in the well. The opening(s) at or near the bottom of the inlet polypipe(s) allow water to enter the polypipe(s) and be pumped to the heat exchange system. After heat exchange, the water can be returned to the same well or different well(s) through the return pipe(s). In many cases, the systems of the invention are open-loop systems.

15 Claims, 12 Drawing Sheets

GROUND WATER HEAT TRANSFER SYSTEMS AND DEPLOYMENT THEREOF

CROSS REFERENCE TO RELATED APPLICATION

The priority of U.S. Provisional Patent Application Ser. No. 60/761,795, filed Jan. 25, 2006 and entitled, ("Ground Water Heat Transfer Systems," is hereby claimed.

BACKGROUND OF THE INVENTION

The use of vertical water wells as a thermal source/sink for efficient ground source heat pump operation has been in use since the 1980s. An often-specified energy conservation system today is a closed loop system that employs pipes, such as polypipes, grouted into the bore of the wall. These grouted loop (GL) systems operate with a secondary heat transfer fluid between the well bore and the heat pump heat exchanger. While GL closed loop systems offer relatively low maintenance over the lifetime of the installation, the high initial cost of the well field is a handicap to universal acceptance.

Open loop systems, on the other hand, operate as traditional water wells. In such systems, each well requires its own pump, which at some point will require replacement. The benefit of open loop systems, however, is that they maximize heat transfer to the well bore rock, particularly where the entire length of the well is used in the heat exchange, a mechanism described in U.S. Pat. No. 5,183,100, incorporated herein. Because of this improved heat transfer, open loop systems require typically half the number of wells drilled as do closed loop systems. This translates into significant initial savings to the owner.

A standing column well (SCW) is particularly suited to open loop systems and the lower-cost benefits thereof, but closed systems are also contemplated herein. Typically, a standing column well is used as both a heat transfer system and a supply well, where the well production permits. With sufficient water flow, the water production, or bleed, of a standing column well may be 10-30% or more of the amount used. However, even with some water taken from the standing column well as supply water, a large volume of water is constantly returned to the standing column well from the heat transfer unit.

With the recent significant increases in the costs of energy, ground source heat pump (GSHP) technology systems, particularly those employing standing column well technology, have become a viable option for heating and cooling of buildings, even more efficient than gas or oil fired furnaces and boilers. Nonetheless, the initial cost of a complete GSHP system installation, drilling, deployment and equipment, has been a hurdle to more significant market penetration of this energy alternative. In the last decade, however, the annual operational cost savings of GSHP technology has demonstrated payback opportunities of 5-7 years. With the more recent escalation of fuel prices, payback time is now typically 3-5 years. However, in order to expand the use of GSHP technology even further, there remains a need to reduce the deployment and installation costs of GSHP systems, making these energy-conservation systems even more economically attractive.

Therefore, there is a need for an improved return water system and installation methodologies that provide an optimal, low cost solution for ground water heat transfer systems for use by individuals and institutions desirous to save costs in energy conservation.

Furthermore, in this time of need for alternative energy sources to fossil fuels and the desire to prevent further harm to the environment, such as contributing to green house gas and other deleterious environmental hazards, there is a need for an environmentally-friendly, clean, self-renewing, non-toxic, and convenient system to provide basic heating and cooling needs for individuals and institutions.

SUMMARY OF THE INVENTION

This present invention features various improvements on an installation methodology for the geothermal field and related systems that offers substantial savings in deployment time and installation cost. In addition, improved component parts further increase the energy conservation and environmental aspects of the present invention, including improvements in new pump assemblies, insulation, well access configurations and well field interconnection strategies.

The embodiments of the present invention are directed to improvements in downhole (or in-well) components, deployment, maintenance, performance and cost of geothermal ground source heat pump systems, concentrating, in particular, on the standing column well configuration, which, taken together, appear likely to have major consequences to HVAC market penetration.

Other features, objects, and advantages of the present invention are apparent in the detailed description that follows. It should be understood, however, that the detailed description, while indicating embodiments of the present invention, is given by way of illustration only, not limitation. Various changes and modifications within the scope of the invention will become apparent to those skilled in the art from the detailed description.

BRIEF DESCRIPTION OF THE DRAWINGS

The Drawings illustrate exemplary embodiments of the principles set forth in the specification, and are not construed to act by way of limitation. It should be understood, therefore, that variations upon the figures in the Drawings and descriptions in the text are permissible, and contemplated as being within the contours of the claims and accorded the widest possible scope consistent with the principles and features set forth herein.

DETAILED DESCRIPTION

Figure 1:
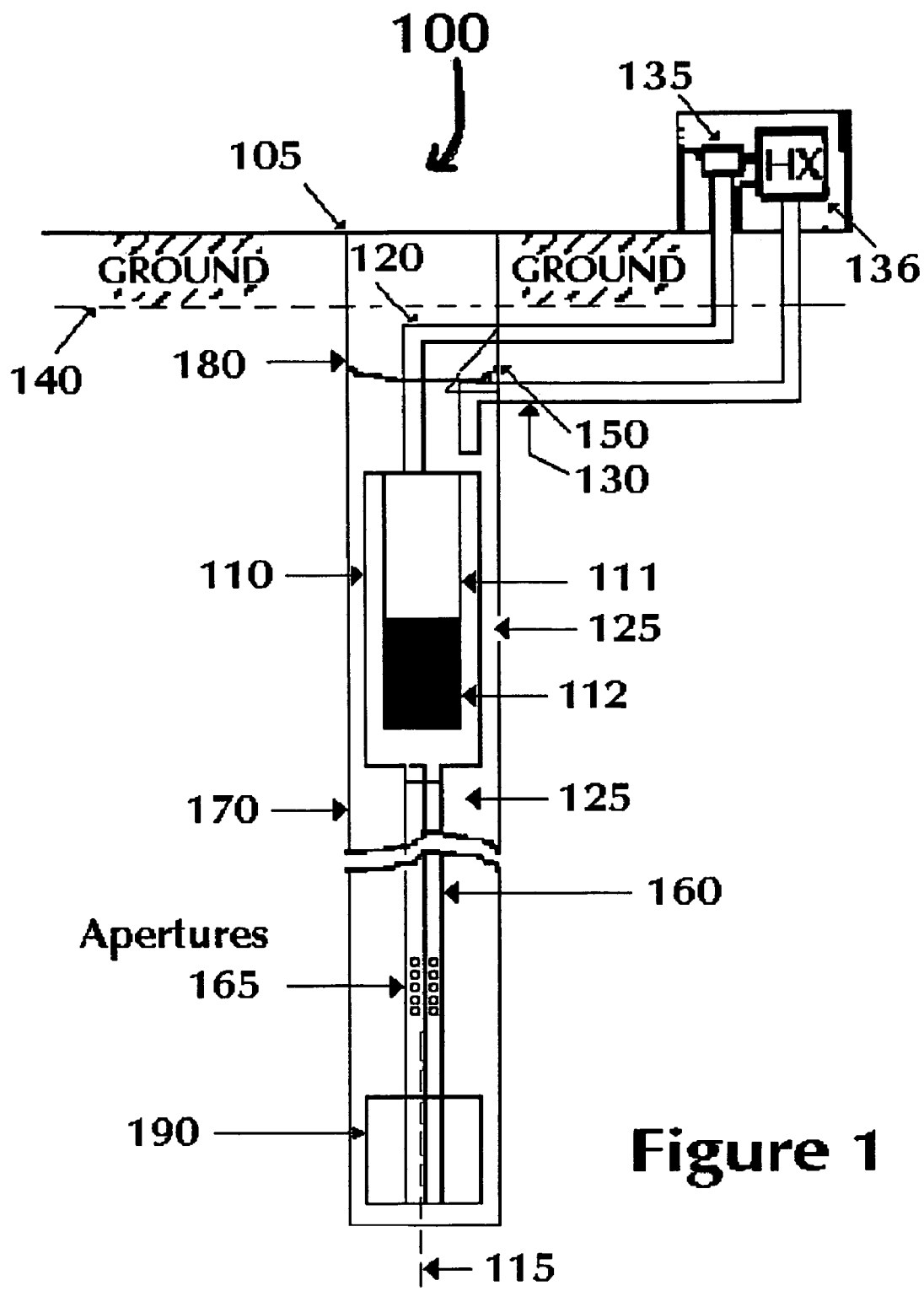
FIG. 1 illustrates an exemplary geothermal SCW configuration driving a ground source heat pump system pursuant to an embodiment of the present invention.

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred and other embodiments depicted herein will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

The present invention features ground water heat transfer systems, and methods of using the same to provide heating or cooling to residential, commercial or other buildings. A typical system of the invention comprises: (1) a water pump which is suspended or affixed in a deep well and connected to one or more water intake pipes or inlet polyethylene (PE) pipes or polypipes, where each inlet polypipe is extended toward the bottom of the well and includes a bottom portion, which has one or more openings or apertures or slits along the sides thereof; (2) a heat exchange system connected to the water pump discharge to extract energy from the temperature differential in the water; and (3) a return pipe connected to the heat transfer system and having a return water outlet back to the deep well, e.g., extending below water level to the pump level in the well.

The one or more openings along the bottom portion of the inlet polypipe allow water in the well to enter the intake pipe and to be pumped to the heat exchange system to initiate heat exchange. The returned water then cycles back into the system, as described further in U.S. Pat. No. 5,183,100 and below.

After heat exchange in the building, the water can then be discharged to the same well or different well or wells through one or more return pipes, such as set forth in co-pending U.S. patent application Ser. No. 11/262,740, filed Nov. 1, 2005, entitled "Ground Source Heat Pump Field Design with Improved Control Strategies," which is a Continuation-in-Part of U.S. patent application Ser. No. 10/825,659, filed on Apr. 16, 2004, and which claims priority to U.S. Provisional Patent Application Ser. Nos. 60/463,032 and 60/463,033, both filed on Apr. 16, 2003, and U.S. patent application Ser. No. 11/657,553, filed Jan. 25, 2007, entitled "Ground Source Heat Pump Well Field Design and Control Strategy for Large Tonnage," and which claims priority to U.S. Provisional Patent Application Ser. No. 60/761,794, filed Jan. 25, 2006, all of which are incorporated herein by reference. The principles of the present invention can be employed in an open-loop system, a closed-loop system, or in other configurations, as are understood by those of skill in this area.

As discussed hereinabove, open-loop geothermal systems significantly reduce the number of wells (total drilled length) required for a specific application, and hence the cost of the well field. Also, the practice of drilling deep wells, instead of shallow ones, results in the need for fewer wells to serve the heating/cooling needs of a given building load, which, in turn, can result in substantially lower installed well field cost. An advantage of open-loop standing column well systems is that the entire bored surface area of the well bore serves as the in-ground heat exchanger, provided a separation means, such as a sleeve, is installed in the well column, whereby the interior portion can draw bottom well water upwards, and the exterior portion or annulus is employed to channel the return water from topside downhole, as noted hereinabove in connection with U.S. Pat. No. 5,183,100, and the aforementioned co-pending patent applications, the entire contents of which are incorporated herein by reference.

In the typical prior art field configuration, this intake pipe or sleeve is composed of a number of concatenated or conjoined 20' (or other) lengths of polyvinyl chloride (PVC) pipes, each normally being 3-4" in diameter. It should be understood that the deeper the well, the more such discrete conjoinings are required, and the wells pursuant to the present invention are quite deep to best accord with building space availability (minimize surface footprint) and energy load requirements. Deployment of this sleeve in these prior art systems, therefore, presents a handicap because each and every pipe section must be securely interconnected to the preceding section.

In many cases, these inter-pipe securements are accomplished by using specialized upset ends on the PVC sections that are joined via a spline (Certaineed) insert, or by using a standard PVC coupling that is glued and screwed to insure water tightness and strength. The time it takes to accomplish this joining task, involving over 50-100 sections per well, however, adds significantly to the field installation time and expense. Therefore, if there were a way to achieve the installation in a fraction of the time, this would result in significant savings. In addition, as with any concatenation of many parts, there is also a need to reduce the risk of error, breakage, or disruption associated with joining multiple sections. With a large number of joinders, however, the chance of a problem, e.g., a portion of the pipe assemblage or sling breaking off and falling downhole, is high without careful deployment protocols.

With reference now to FIG. 1 of the Drawings, there is illustrated an embodiment of the present invention, a ground source heat pump (GSHP) system, generally designated by the reference number 100, for a standing column well. A well, generally designated by the reference number 105, has a pump assembly 110, suspended downhole, a water discharge line 120 and a water return line 130. Lines 120 and 130 are below a frost line 140 and connected to the well 105 through pitless adaptors, generally designated by the reference number 150, which seal the flow and prevent contaminants from entering the well. More information on pitless adaptors and improvements in water return line dispersal in the well are set forth in Applicant's co-pending U.S. patent application Ser. No. 11/600,871, filed Nov. 17, 2006 and entitled "Ground Water Heat Transfer Systems," incorporated by reference in its entirety herein. Extending from the base of pump 110 are one or more water intake or extension lines 160, extending downhole toward the bottom of the well bore 105.

As illustrated, pump assembly 110 is located substantially within the core area of the well bore 105, i.e., generally centrally within the well bore 105 and along a central axis 115 of the well bore 105, which is, of course, substantially circular. The water volume of the well bore 105 surrounding the pump assembly 110, i.e., along the periphery away from the central axis 115 and outside the pump assembly 110, the discharge line 120 and the water intake line(s) 160, is the annulus, generally designated by the reference numeral 125, whereby water can traverse downward in the well 105. As is understood in the art, the well bore 105 is preferably encased by a well casing 170, e.g., brickwork along the sidewalls to a depth from the surface to the start of bedrock. Whereas the water intake lines 160, pump assembly 110 and water discharge line 120 form a conduit for water from the bottom of the well bore 105 to rise for discharge, the remainder of the well volume, deemed the annulus 125, surrounds these components and provides an external conduit for water flow downwards, contacting the sidewalls of the well bore 105 along the way, e.g., the casing 170, and completing the energy transference cycle.

In operation, the pump assembly 110 of the system 100 of the present invention draws water from the bottom portion of the well bore 105, via the water intake line(s) 160, and pumps the water through the water discharge line 120 to a filter 135 and then to a heat exchanger 136, both of which are topside for access to a facility. The water, whether hotter or cooler from before, then exits the heat exchanger 136, and returns to the well bore 105. More particularly, the return water disperses into the annulus region 125 at the top of the SCW, using a drop-tube to reach below the surface of water or improved dispersal techniques above the surface of the water, such as more fully described in Applicant's aforementioned co-pending U.S. patent application Ser. No. 11/600,871, incorporated by reference herein.

It should be understood that the return water, dispersed into the annulus region 125 near the top of the well bore 105 (e.g., at or near the top of the pump assembly 110 and below water level 180), travels downward along the side walls of the well casing 170, i.e., along the annulus 125, making thermal contact with the hotter/colder side walls and exchanging heat therewith. By virtue of the annulus region 125 being thermally separated from the intake mechanism, i.e., the water intake line(s) 160, pump 110 and water discharge line 120 are imperforate, the return water must traverse downwards in the well 105 to be again drawn up by the water intake line(s) 160 for further circulation. As discussed further hereinbelow, the lower portion of the water intake line(s) 160 includes a number of apertures through which the intake water flows, generally designated by the reference numeral 165, which may constitute holes or slits. In this fashion, which is a distinct advantage of GSHP systems 100, particularly deep well installations, even moderate temperature differentials stored in the earth's rock can be employed for heating and cooling. Indeed, the entire well bore 105, extending for perhaps 1,5000 feet downward, can be used for this heat exchange.

To minimize work and the energy needs placed on the pump assembly 110, hydrodynamic pressures must be taken into consideration. By positioning the pump assembly 110 fairly shallow in the wellbore water, e.g., 100' below the surface, one can minimize the static head pressure, while being cognizant of the seasonal variations in water column height. In this manner, a sufficient volume of fluid could be pumped by a relatively small pump to cause a high enough flow rate in the system for heat transference. As noted in U.S. Pat. No. 5,183,100, with sufficient flow rate downwards along the annulus 125, sufficient turbulent flows are generally created, increasing the heat transfer coefficient along the sidewalls of the well casing 170. The full dynamic of turbulent and laminar flows and mechanisms to accentuate or minimize same are understood to those skilled in the art, and also discussed further hereinbelow.

As discussed hereinabove, one embodiment of the present invention is directed to improvements in deployment of the systems 100. Since the wells of the present invention may be quite deep, e.g., 1,000 feet or more, the water intake line or lines 160 can be very long, requiring multiple conjoining or concatenating in prior art systems.

As indicated hereinabove, the prior art is replete with the concatenation or conjoining of smaller length, e.g., 20' PVC sections during well installation to form the entire assembly. This technique, although time-consuming, has come about due to the use of PVC pipe in this construction and the general supply of PVC pipe in 20' or other such specific lengths. PVC pipe, e.g., at 3" to 4" or so in diameter, is thick and, more significantly, resilient, and not subject to bending. Thus, logical considerations forbid significantly lengthy unitary lengths of PVC pipe, in view of industry customization into particular lengths common, with 20' being the longest practical length. Thus, use of large bore PVC pipes for water intake pipes 160 necessitates the time-consuming, conjoining approach.

Instead of using one large and inflexible water intake pipe 160, however, Applicant has found through field experience an alternative approach that saves considerable time and expense and also solves many of the problems encountered in these prior art systems. In particular, to provide the required design GPM (gallon per minute, where one gallon equals approximately 3.785 liter), a bundle of discrete water intake pipes 160, e.g., 1.25"-2" or so in diameter, may be used to substitute for the practice of employing 20' PVC sections (e.g., with a diameter of 3-4 inches), which require either the use of upset ends and a spline lock, or a glue and screw method to interconnection succeeding sections. As is well known to those skilled in the art, the throughput of a large pipe can be duplicated by employing two or more smaller pipes, and the calculations for this are straightforward. Instead of using large bore and inflexible PVC pipe, Applicant has found that the water intake conduit or sleeve 160 can be formed of several, smaller bore polyethylene (PE) or polypipe material, which can be spooled in long lengths and unrolled as a long unitary pipe in deployment.

In one embodiment of the instant invention, the water intake pipe 160 design employs either 1,000-foot, 800-foot or 500-foot reels of polypipe, at 1.25", 1.5" or 2" diameter, respectively, fed downhole from the surface, e.g., via a concrete weight 190 that encases the terminal portion of the water intake pipe(s) 160, e.g., a 5-inch diameter cement casting that captures the ends, e.g., approximately 20', of the polypipes 160 and facilitates leading them downhole. As discussed, water intake is just above the leading weight 190 through the apertures 165. Additional pipe lengths are accomplished through the use of fusion bonding or other means, as described hereinabove. In any event, for most deep wells, only a small number of such conjoinings or concatenations are required to form the entire water intake pipe 160 of the GSHP assembly 100. Additionally, shallower wells, e.g., under 1,000 feet for 1.25" polypipe, pumped at lower flow rates, benefit from this technique also in that the entire water intake pipe 160 can be formed of a unitary construction without breaks and without potentially faulty conjoining.

The proposed deployment method, accordingly, saves considerable installation time, thereby reducing the cost of the installed well field, where with many wells, hundreds of such joinings would be needed in prior art techniques. In many embodiments, the systems of the invention are open-loop systems. However, close loop or other configurations may also be used.

Figure 2:
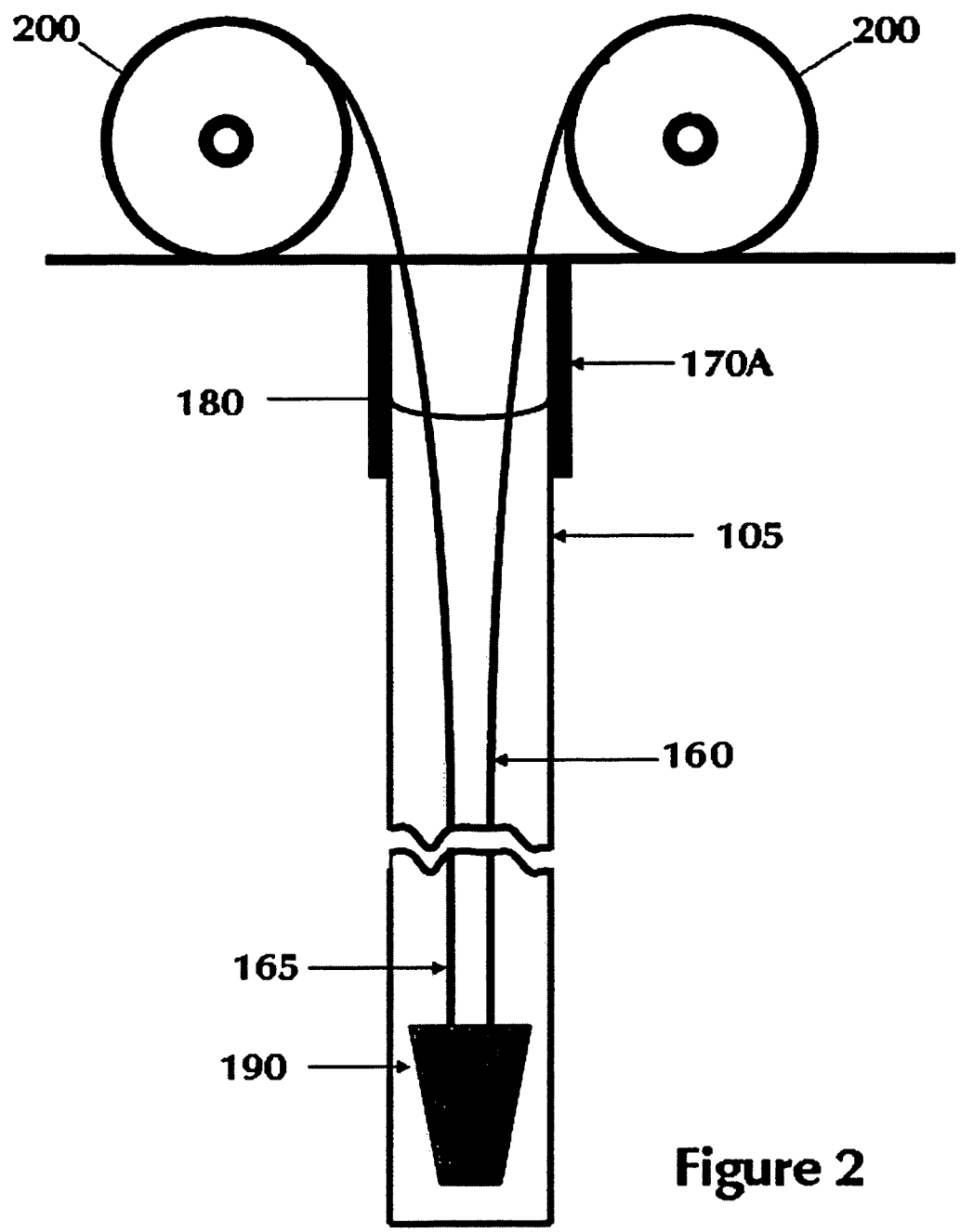
FIG. 2 illustrates an exemplary deployment technique for deploying or installing the downhole portion of an SCW, such as the configuration depicted in FIG. 1, into a well according to another embodiment of the present invention.

With reference now to FIG. 2 of the Drawings, there is illustrated a methodology for eliminating the aforementioned PVC joining practices in favor of feeding a continuous length of smaller bore polypipe down hole. As shown in FIG. 2, the initial feeding of the water intake pipes 160 into the well hole 105 occurs after the drilling of the well bore 105. Here two water intake pipes 160, i.e., polypipes, are deployed from discrete reels 200, as may be found commercially. For example, at present 1.25" diameter polypipe can be purchased in 1,000' reels, 1.5" diameter polypipe can be purchased in 800' reels, and 2.0" diameter polypipe can be purchased in 700' length reels. As discussed, in a preferred deployment of the present invention, a pre-cast concrete (or other such heavy material) weight 190 is affixed at the terminal end of the pipes 160 at initial deployment. The weight 190 facilitates guiding the pipes 160 downhole, insuring that the open ends of the pipes 160 do not snag or damage against the well bore 105, which may be rough or encased 170 all the way down.

It should be understood that the pipes 160 can be bound together at various points, e.g., a field tie every 20-40 inches. The number of pipes 160 required depends upon the desired flow rate. Thus, although two are shown in FIGS. 1 and 2, more may be employed, e.g., 3 or more may be bounded together in the fashion described herein. Where the deployed design length of the well bore 105 depth exceeds the 1,000-foot, 800-foot or 500-foot reel lengths, then two or more lengths can be joined by standard fusion welding, as set forth above. To address potentially higher flow rates demanded by commercial usage, however, more throughput is necessary, e.g., two or more 1.5-inch or 2-inch diameter polypipe reels may be simultaneously fed from reels at the surface proximal to the well site, as shown in FIG. 2. As is understood in the art, the top portion of the well bore 105 is preferably encased with steel or PVC to support against soil cave-in and additional topside activities, e.g., the deployment of the pipes 160 with weight 190. This more limited casing, generally designated by the reference numeral 170A, may be preferred with particular drillings, as is understood in the art.

With reference again to FIG. 1, a lower portion of the water intake pipes 160, e.g., a bottom 20-foot length above the weight 190, includes various apertures 165, e.g., a series of holes or perforated/slitted sections to act as a water inlet to the interior of the upcoming polypipe to the pump assembly 110. In the preferred embodiment, the polypipes 160 are attached to the suction side of the pump assembly 110 via fittings that are part of a PVC housing around the pump inlet, described further hereinbelow.

With reference now to data set forth in Table 1, there are illustrated various parameters required for a water intake pipe or polypipe 160 design to meet a specific pump design flow rate. The diameter of the water intake pipe 160 downhole in this example is predicated on a design of 4 fps (foot per second). To achieve the required cross-sectional area for upflow to the pump assembly 110, without introducing excessive pressure drop, two or more 2-inch (in diameter) polypipes 160 may be used. Where column 2 designates a sleeve diameter of more than 2 inches, two (or more) polypipe pipes or sleeves 160 can be employed.

TABLE 1

Polypipe sleeve design analysis as a function of pump GPM

| Pump (GPM) | Inlet Pipe or Downhole Sleeve (inch) | Perforation Slit (foot) | Perforation Slit @Re = 7000 | Return Pipe or Discharge Pipe (inch) |
|---|---|---|---|---|
| 33 | 1.84 | 2.35 | 7.37 | 1.30 |
| 40 | 2.02 | 2.85 | 10.82 | 1.43 |
| 60 | 2.47 | 2.14 | 12.18 | 1.75 |
| 80 | 2.86 | 2.85 | 21.65 | 2.02 |

As previously indicated, at the end or a lower portion of the polypipe, the polypipe comprises a perforated section 165 for water intake at the bottom portion of the well. While the apertures or perforations 165 can be either holes or slits, the latter may be easier to manufacture. The analysis assumes the use of 2-inch polypipe (available in 500' reels) and two diametrically-opposed slits per pipe 160 to function as the perforated section 165. At a slit width of 3/32 inches, for example, columns 3-4 show the results of calculations to determine slit length required to meet certain volumetric consumption. Column 3 assumes a design condition of 4 fps at the slit entrance and invokes a factor of two to account for potential fouling. Column 4 considers the design imposition of a more laminar entrance (Re<7000, where Re denotes the Reynolds number) to reduce the effects of stirring and entraining bottom hole debris. While the variance is large, any slit lengths in-between these results are considered acceptable. It should be understood that similar calculations can be made for other diameter polypipes 160 considered, e.g., 1.75-inch, 1.5-inch, 1.25-inch and 1.0-inch.

Column 5 completes the analysis of the pump assembly 110 by considering the appropriate size of the pump discharge to meet the design specification of 8 fps. At 33 GPM, for example, a 1.25-inch line is acceptable; at 40 GPM, a 1.50-inch line; at 60 GPM, a 1.750-inch line, and at 80 GPM, a 2-inch diameter polypipe discharge line is recommended.

As is apparent from the above description, the net benefit to the use of continuous-length polypipe 160 as a pump assembly 110 suction line extension is the speed with which it can be deployed from large reels 200 (e.g., 1,000, 800 or 500 feet) at the surface, as illustrated in FIG. 2. The labor associated with joining 20-foot PVC sections (e.g., 50-100 joints per well) is significant, and great care is needed for each joining to insure integrity of the whole. Another factor is the equipment needed on-site to lift and support the PVC sections during the joining process. This activity either ties up the driller's rig, or, at best, creates a need for a separate piece of equipment (cherry picker, etc.) for supporting and periodically releasing the assemblage or string, as the length of pipes 160 is known in the art.

A detailed analysis of the personnel, time, materials and equipment savings to deploy equivalent strings of PVC sections versus a continuous (except for fusion bonding) polypipe feed in a 1000-foot well suggests a polypipe deployment savings of approximately 5 times less expensive than with the labor and materials used in deploying PVC 20' sections bonded together. This translates into significant cost savings for the overall GSHP system 100 installation, making GSHP system installation much more of a commercial reality for the public and institutions.

Figure 3:
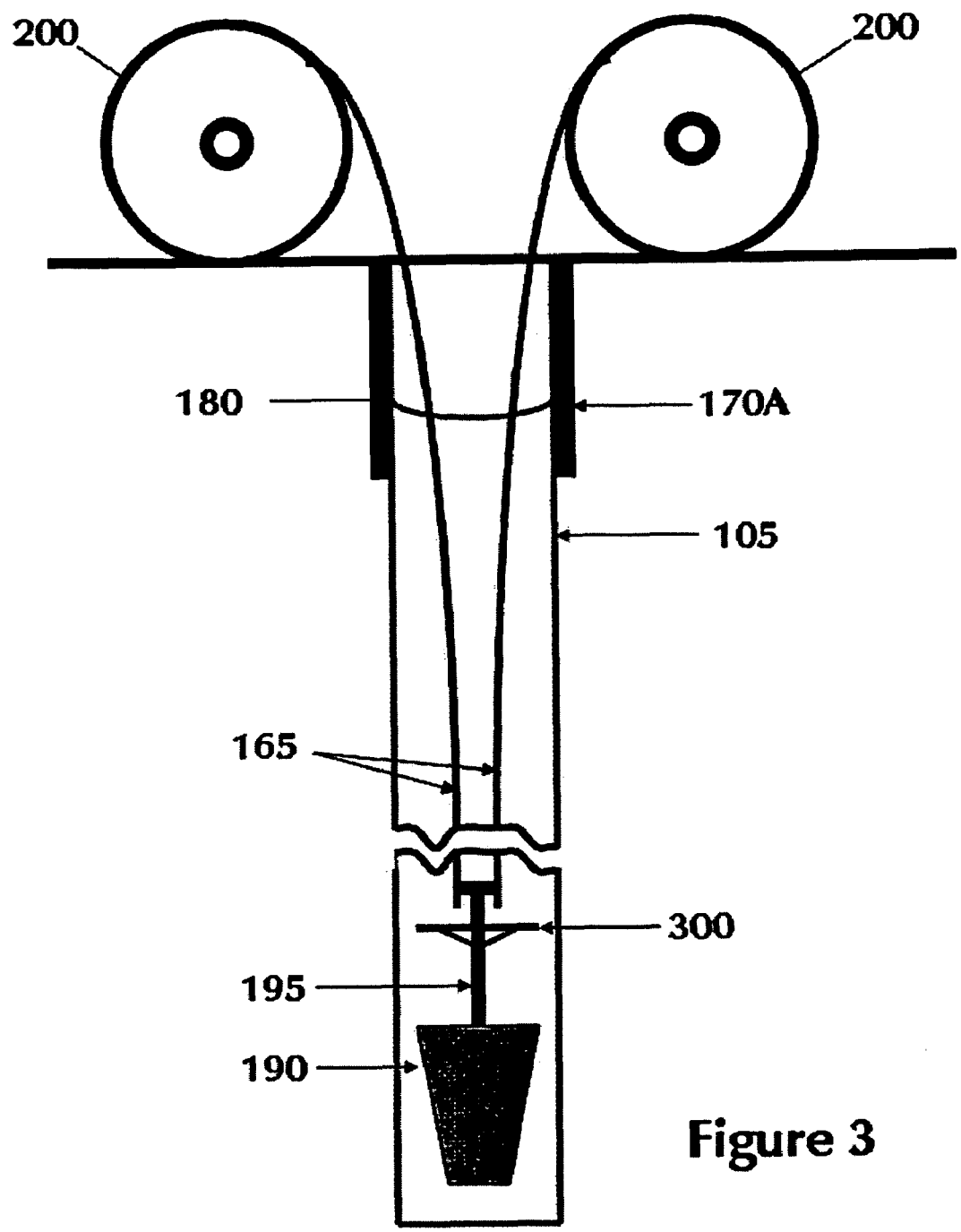
FIG. 3 illustrates another deployment technique, such as depicted in FIG. 2, pursuant to an alternate embodiment of the present invention, also providing anti-sediment intake measures.

With reference now to FIG. 3 of the Drawings, there is illustrated a preferred alternate approach to the embodiment shown in FIG. 2. As with the methodology employed in the earlier embodiment, a weight 190 is employed to the end portion of the water intake pipes or extension lines 160, which facilitates feeding the pipes 160 down the well bore 105, as described hereinafter. However, this embodiment differs in that the ends of the water intake pipes 160 are not entrapped in concrete, as with the embodiment set forth and described in connection with FIG. 2, but are instead left open and attached to a separate tie 195, e.g., a poly-tieline, that is itself entrapped in the concrete weight guide 190. As shown in FIG. 3, a debris baffle 300 is affixed to the tie 195 downward of the ends of the pipes 160, allowing water intake therethrough and also preventing sediment at the well bottom from entering directly into the water intake pipes 160.

Applicant has found that debris from the well bottom can play a part in hampering fluid circulation in wells, such as shown in FIGS. 1 and 2 and the prior art. As with the prior embodiment, slits or apertures 165 are also employed with this embodiment, e.g., about 20 feet upwards from the ends of the pipes 160. These slits 165 are designed to allow laminar flow therein so as to prevent turbulent stirring of bottom sediment or other debris from being carried up into the water intake pipes 160. Instead of closing the ends, e.g., encasing them in concrete as with the prior embodiment, this embodiment leaves the ends open. Applicant has found that leaving the ends of the pipes 160 open captures any sediment that does enter (and getting past the baffle 300) from being carried up to the pump assembly 110 and beyond. Also, larger sediments that would have migrated to the slits 165 are instead captured earlier, allowing the slits 165 to operate sediment-fee and unclogged for a longer period of time. With periodic back-flushing and quiescent time for the well 105, sediment blockage can thus be better controlled.

Figure 4:
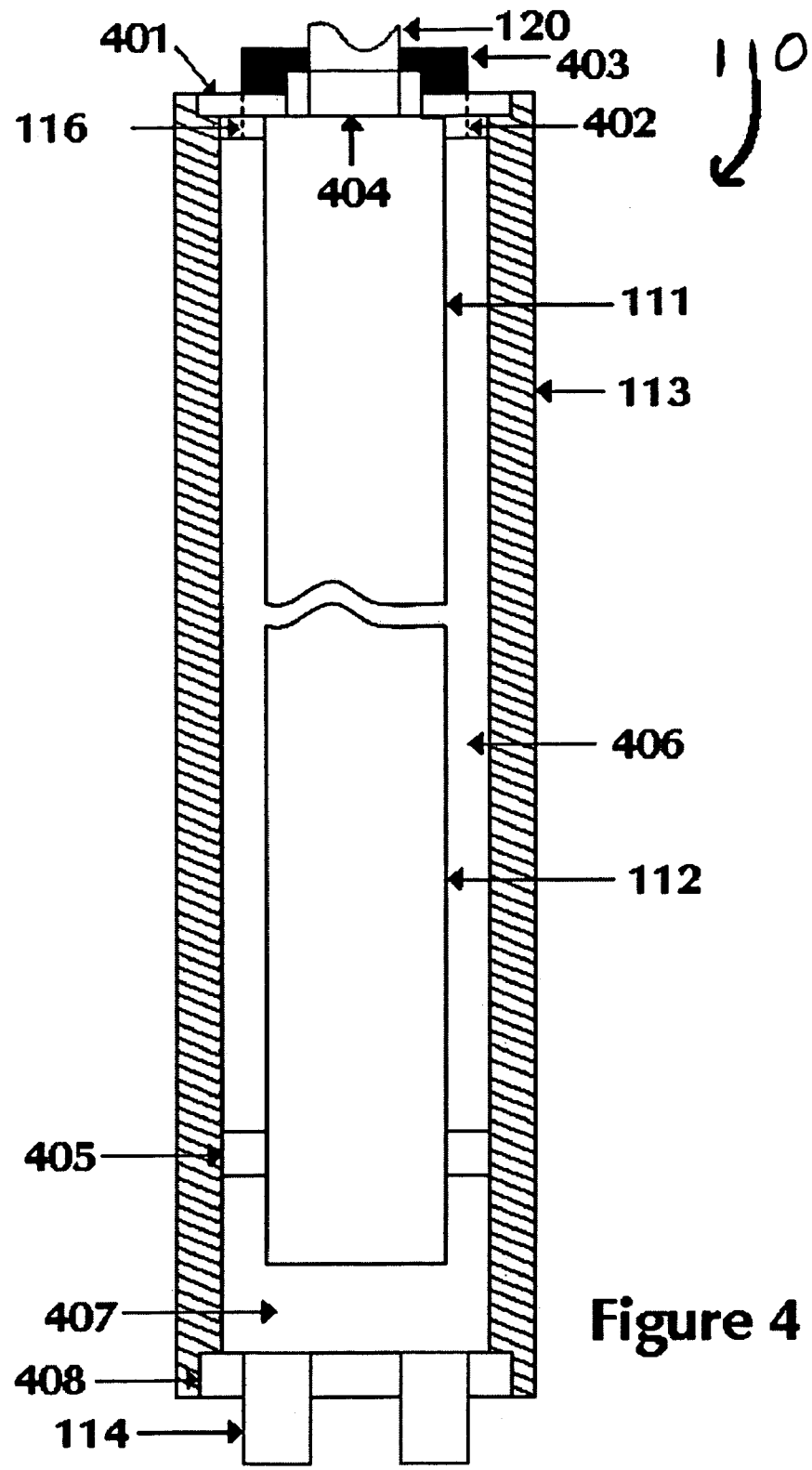
FIG. 4 illustrates a first embodiment of an improved submersible pump assembly housing configuration of an SCW-ground source heat pump system pursuant to the teachings of the present invention, where the pump assembly is sealed.

With reference now to FIG. 4 of the Drawings, there are illustrated additional techniques, methodologies and structures that further facilitate the deployment of the energy conservation, geothermal systems of the present invention. As also illustrated in FIG. 1, the pump assembly 110 is an assemblage of various components, including a pump 111, a motor 112, a housing or shroud 113 and other parts described below. The pump assembly 110 in the embodiment shown in FIG. 4 is sealed. Further details as to this embodiment are set forth below.

At the base of the housing 113 are attachments for the aforementioned water intake pipes 160, preferably also made of polypipe. These attachments, generally designated by the reference numeral 114, are preferably ferruled connections, upon which the pipes 160 are affixed. As previously indicated, the polypipe lines 160 effectively extend the reach of the pump 111 downhole. In particular, the base portion of the housing 113 preferably includes 1-3 bayonet fittings or ferruled attachment ports 114 upon which the pipes 160 are securely affixed to the housing 113.

It should be understood that the ferruled ports 114 can be injection molded in one piece into the base of the housing 113, or could otherwise be separately attached metal, e.g., bronze, brass or stainless steel, or molded PVC nipples, as are understood in the art. A nippled design allows the ferruled parts 114 to be screwed into a thick base portion of the housing 113.

Figure 5:
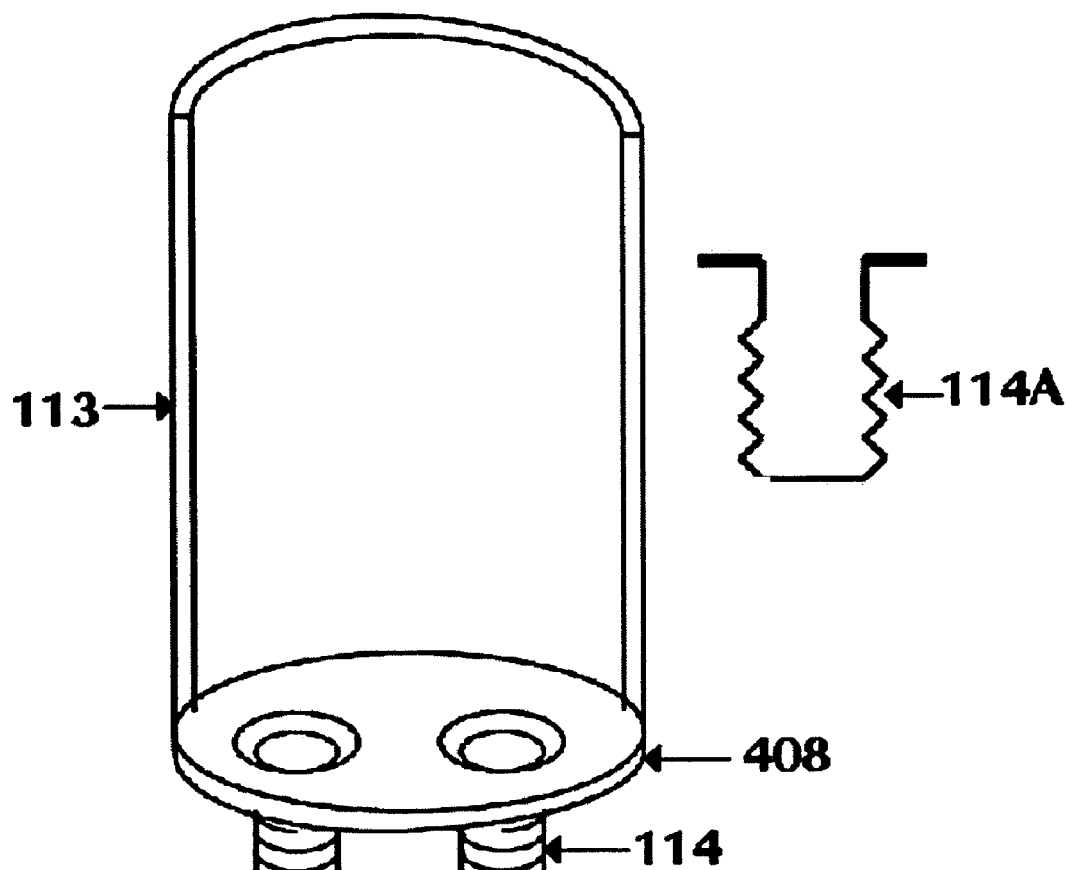
FIG. 5 illustrates the attachment ports of the housing of the improved pump assembly shown in FIG. 4 with an alternative affixation means also depicted.

With reference now to FIG. 5, there is illustrated the aforementioned ferruled ports 114 molded into the base cap 408. An alternate affixation design for the ports 114 would be a flanged insert, which is also illustrated in FIG. 5 and generally designated by the reference numeral 114A. The flanged inserts 114A could have the respective water intake pipes 160 glued onto them or be affixed, via a metal fixture, to the insert 114A with a gasket and nut. Attachment can then be accomplished using standard procedures, such as heating the ends of the pipes 160, forcing the pipe ends over the ferruled ports 114/114A, and securing the pipes 160 thereon with hose clamps or other binders. It should, of course, be understood that this attachment must be strong enough to support the entire length the of the water intake pipe or pipes 160 extending downhole, as well as the leading weight 190 and any other apparatus affixed thereto. Although the dead weight will be lessoned by immersion in water and other buoyancy means described in more detail hereinbelow, affixation and securement are critical. Where polypipe material is used instead of PVC, the dead weight is diminished due to the buoyancy of polypipe material. Whereas PVC is denser than water, polypipe is not.

With further reference to the embodiment of the pump assembly 110 and housing 113 shown in FIG. 4, there is shown a bleed air port 116, allowing any entrapped air within the pump assembly 110 to escape. The pump 111 used in this example is a standard 4" submersible pump, and the housing 113 is a non-standard 4.5" PVC pipe section that surrounds the pump 111 and motor 112. For a Gould 33GS20 pump, for example, the overall assembly length is 32.7". Therefore, the interior space of the housing or shroud 113 must be sufficient to accommodate this length, as well as having an interior diameter sufficient to cool the operating motor 112. Analysis of minimum required pump annular space available to insure proper cooling suggests a minimum interior diameter of 4.238" for the embodiments described herein. Of course, alternate diameters and lengths are possible so long as downhole water flow along the annulus 125 is unimpeded.

With further reference to FIG. 4, there are illustrated additional components of the pump assembly 110. At the top, there is a flange 401, which can be made of PVC, and a wire penetration mechanism, generally designated by the reference numeral 402, to permit electrical connection of the pump motor from the outside, as is understood in the art.

A retainer nut 403 secures the top portion by engaging a shoulder gasket 404 extending from the pump 111. The water discharge line 120 extends from the top of the pump 111, as illustrated. At the bottom, there is a guide collar 405 to secure the motor 112 in place centrally, allowing free passage of fluid therearound to cool the motor 112 when in operation. The interior annular space around the motor 112 is designated by the reference numeral 406. An interior space at the bottom of the pump assembly, designated by the reference numeral 407 and extending up to the guide collar 405, receives the incoming water through the ferruled or other attachments 114 from the water intake pipes 160. The water passes through the interior space 406, cooling the motor 112, and is drawn up by the pump 111. An air bleed hole or port 116 permits extraneous air entering the pump assembly 110 to exit, e.g., through a small hole or float valve, thereby preventing cavitation of other potential deleterious effects. Also at the bottom is a bottom cap 408, which can be made of PVC and which threadedly engages the housing 113 to form a seal therebetween. As discussed, the ports 114 can be formed as part of the cap 408 or otherwise secured thereto.

By way of a specific pump example, a 4" diameter Gould 33GS20 pump suggests a minimum 0.25 fps (feet per second) flowrate and 1.2 PM with this recommendation:

1.2 gpm/60 s×8.33 lb/gal×1/62.34 lb/cuf/0.25 fps=$A_x$ (flow cross-sectional area), where $A_x=\pi/4\ (d_o^2-d_i^2)$, where d is outer/inner diameter of the housing 113, with $d_i$=4", $d_o$=4.238", as the minimum acceptable interior shell 113 diameter, based on the needs for motor cooling. The above proposed design uses a 4.375" diameter as a standard interior dimension for a 4.5" PVC schedule 40 pipe.

The design presented in FIG. 4 is consistent with this analysis. With the above recommendations, the bottom shroud cap or plate 408 is recommended to be ⅜" thickness to accommodate sufficient thread as an endcap that carries the load of the length of polypipe 160 or string suspended underneath. The endcap 408 also includes one or more holes therethrough to accommodate the insertion of 1.5-2" diameter ferruled fittings 114 that affix the polypipe extension lines 160 to the shroud 113. As discussed, those ferruled fittings 114/114A may be glued to the shroud endcap 408 or mechanically attached as a standard nipple fitting.

With further reference to a specific embodiment pursuant to the teachings of FIG. 4, the aforementioned upper cap 401 is preferably also made from ⅜" stock and glued to the shroud 113 shell as a permanent closure. The design, as presented, includes an offset flange for greater glue contact area and load carrying capability. Before the housing or shroud 113 is placed around the pump assembly 110, a rubber gasket is slipped over the pump NPT discharge fitting and onto the pump assembly shoulder at the top to attempt to seal against water penetration from outside. A small ⅛"-3/16" diameter hole or port 116 is drilled through the top flange inline with the annular water volume adjacent to the pump assembly. In another embodiment, a small air bleed float valve is inserted into the hole 116 to automatically expel air trapped during insertion of the pump assembly 110, preventing pump cavitation. In one embodiment, the bleed hole 116 may be connected to a flexible hose that extends along the pump discharge line, i.e., along the water discharge line 120, to a point above the water line 180. This valve also prevents any water inflow from above and outside the shroud 113 that might tend to thermally short-circuit and denigrate the thermal advantage of using bottom-hole water.

The shroud 113 shown in FIG. 4 is shown with an interior guide collar 405 to help support the pump assembly 110 during the assembly process, so as to eliminate any cantilever strain on the shroud top. To keep from impeding the passage of water in the shroud 113 to the pump 111, the guide collar 405 is designed with three relatively narrow guide fingers, so as to leave the majority of the annular cross-sectional area free.

The retaining nut 403 is used to secure the shroud 113 over the pump 111 and bear against the shoulder gasket 404 as a water seal. The retaining nut 403 is designed to be consistent with the threads of the 2" NPT pump discharge line fitting. The nut 403 is limited in outside diameter by the radial distance to the air bleed hole 116.

Figure 6:
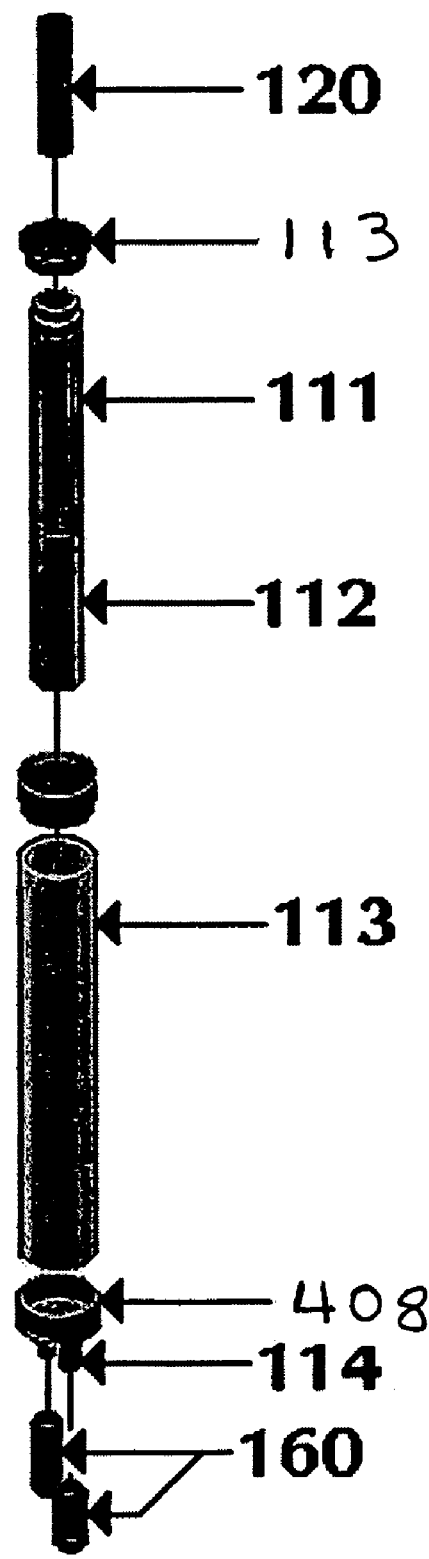
FIG. 6 illustrated an exploded view of the pump assembly shown in FIG. 5.

With reference now to FIG. 6 of the Drawings, there is illustrated an exploded view of the pump assembly 110 shown in FIG. 4. As shown in FIG. 6, water intake pipes 160 are affixed to attachment ports 114, which could be bayonet fittings or ferruled ports described in more detail hereinabove. The ports 114 could be affixed to or integral with the bottom cap 408, e.g., injection molded together. Cap 408 connects to the housing 113, as illustrated. The pump/motor 111/112 slides into the housing 113, and the upper cap seats into the tapered flange 401 to seal the top of the housing. The water discharge line 120 extends from the housing 113.

In maintenance, however, Applicant has noted some disadvantages due to the installation and usage of the above sealed pump housing deployment illustrated in FIG. 4. For example, during maintenance of the system 110, e.g., maintenance on or replacement of the pump 111, the entire configuration 100 must be pulled upwards and supported in place, e.g., the polypipes 160 extending downhole while the pump assembly 110 is dismantled, to access the pump 111 therein. Thus, a cherry picker or other heavy equipment is needed for any maintenance, or the entire system 100 raised above ground.

By way of further observation and experimentation, Applicant has discovered an improvement on the aforementioned sealed configuration set forth in FIG. 4 that minimizes the effort required in maintaining the pump 111 and other components that may require access to the housing 113. This presently preferred embodiment is set forth below and illustrated in connection with FIG. 7.

Figure 7:
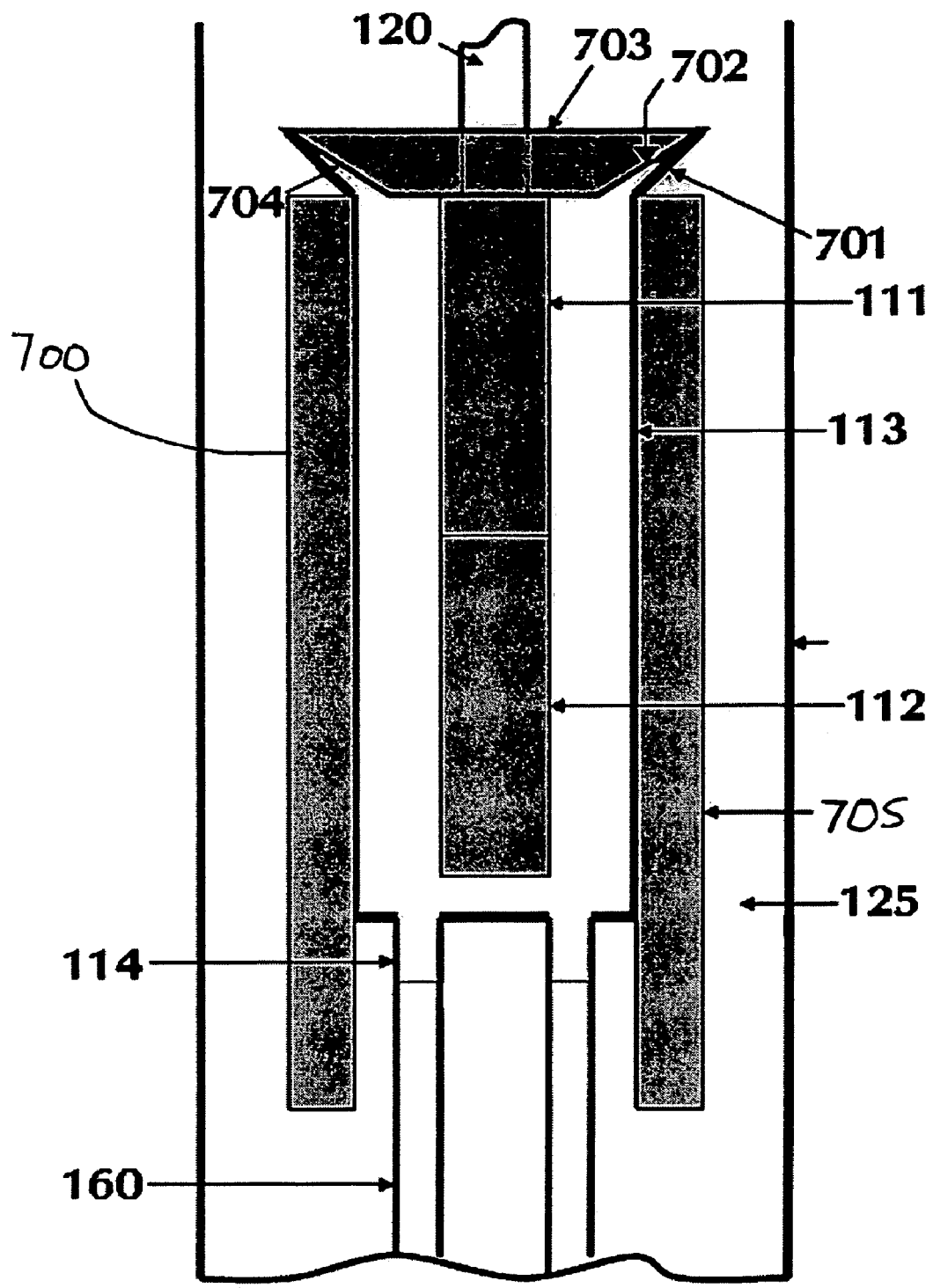
FIG. 7 illustrates a second and more preferred embodiment of an improved pump assembly pursuant to the principles of the instant invention, where the pump assembly is more accessible.

With reference now to FIG. 7 of the Drawings, there is shown a deployment improvement over the prior art and over FIG. 4. As illustrated, a pump assembly, generally designated by the reference numeral 700, is situated within the well bore 105, which is shown in this embodiment (but omitted in FIG. 4). As with the prior embodiments shown, pump assembly 700 includes a pump 111, a motor 112, and attachment ports 114, which connect to respective polypipes 160, as set forth in more detail hereinabove. Pump assembly 700 pumps the water through the water discharge line 120, and the water, once returned, is recirculated, passing downhole through the annulus 125.

Pump assembly 700, however, has a different housing 113 configuration, which facilitates access. As illustrated, housing 113 has a flared cap portion 701 extending upwards and outwards from the top of the housing 113. The cap portion 701 is preferably of unitary construction with the rest of the housing 113 and forms an angled seat topside, generally designated by the reference numeral 702, to seat a housing cap member 703. As described before, deployment of the polypipe 160, e.g., with the weight 190, first feeds the lengthy portion of the construction downhole. Since the polypipes 160 require little or no maintenance, particularly with unitary or few joinders and with adequate anti-clogging measures in place for the apertures 165, this embodiment separates the component parts of the system that are downhole into two sub-assemblies: a detachable uphole assembly (containing the water discharge line 120, housing cap 703, pump 111 and motor 112) and a downhole assembly (housing 113 and polypipes 160).

The advantage of this embodiment is manifest: ease of access to the components of the system 100, particularly to replace an uphole component, e.g., the pump 111, prone to eventual maintenance problems. With further reference to FIG. 7, the water discharge line 120 includes the pump 111/motor 112 and a housing cap member 703. The cap 703 has a reciprocal surface, generally designated by the reference numeral 704, designed to mate with or otherwise engage the corresponding surface of the flared cap 701, more particularly, the angled seat 702 thereof. It should be understood that the angles of the seat 702 and the reciprocal surface 704 be engineered to provide an appropriate seal on the top of the housing 113 upon engagement, sealing the housing 113.

With further reference to FIG. 7, there is shown one embodiment of a flotation collar 705, which is secured around the housing 113. As illustrated in FIG. 7, the flotation collar 705 is tubular in configuration, with the housing 113 therebetween. The flotation device is intended as a means to suspend the heavier than water PVC housing at the design depth in the well, prior to the installation of the pump assembly and sealing cap 701. The actual seat is established at the mating cap surfaces by the weight of the pump assembly against the buoyant force of the housing collar, as well as by the suction of the pump in operation.

In this fashion, a few extra steps in deployment lead to great improvements in servicing the system later. For example, the polypipes 160, affixed to the weight 190 (with or without the baffle 300) are fed downhole. After determining the length of polypipe 160 needed, the ends of the polypipes 160 are affixed to the housing 113, i.e., onto the attachment ports 114. In the prior embodiment, the sealed pump assembly 110 is affixed to the water discharge line 120, which connects to the heat exchange system 136 via pitless adaptors 150, providing ease of connectivity. When a pump 111 failed, the previous embodiment requires that the water discharge line 120 be disconnected via the pitless adaptors 150, and the entire system be pulled up or otherwise supported in place, e.g., a dedicated cherry picker or other device is required to hold the string in place to prevent falling down in the well 105. Thus, unless the pump assembly can be readily disassembled, the pump or other failed part exchanged, and all connections and seals be made quickly, the cherry picker would be in use for considerable time.

Accordingly, an advantage of the embodiment shown in FIG. 7 is that there is less or no need for a cherry picker or other device to lift or otherwise hold the string when exchanging pumps 111 or performing maintenance on the uphole portion. The weight of the pump-motor assembly is listed as 38 lbs, which can be handled easily by one person during the maintenance period. Thus, deployment entails inserting the polypipes 160, with the weight 190, into the well bore 105, affixing ends to the attachment ports 114 of the housing 113, securing the flotation collar on the housing 113, and then letting down the downhole assemblage on a single guideline that is retained at the top of the casing. The pump assembly with sealing cap is then dropped via the discharge line appendage into the housing and affixed to the pitless adaptor 150, to complete the downhole deployment.

Figure 8:
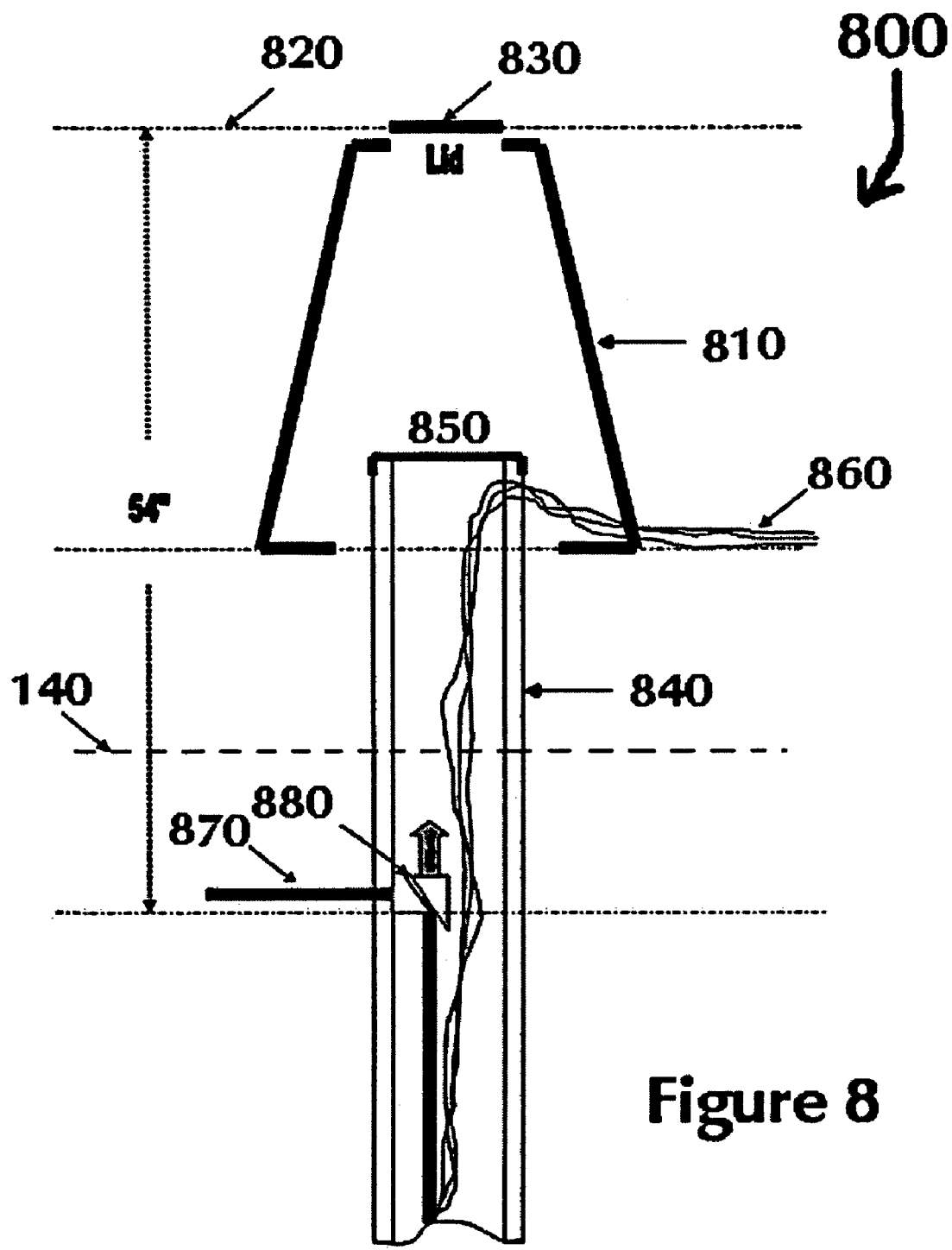
FIG. 8 illustrates an improvement in providing access to underground well heads for SCW-ground source heat pump systems pursuant to the present invention.

With reference now to FIG. 8, there is illustrated a further improvement on deployment of a heat transfer system pursuant to the present invention, which facilitates access to the system 100 components in situations where above-ground space is limited or aesthetics play a role. As shown in FIG. 8, a wellhead, generally designated by the reference number 800, has an accessway 810 extending below ground level, designated by the reference numeral 820, and topped with a lid 830, which is substantially at ground level 820 and provides access to accessway 810. With further reference to FIG. 8, accessway 810 provides access to a well 840 topped by a well cap 850. Also shown in the figure are wires 860 for the pump mechanism downhole, and a wall line 870, i.e., the aforementioned water discharge line 120 and the water return line 130, each of which are also buried and below frost level 140, and entering the well 840 through pitless adaptors, generally designated by the reference numeral 880. Access to the pump housing 110 or pump 111 therein is made as discussed hereinabove.

Figure 9:
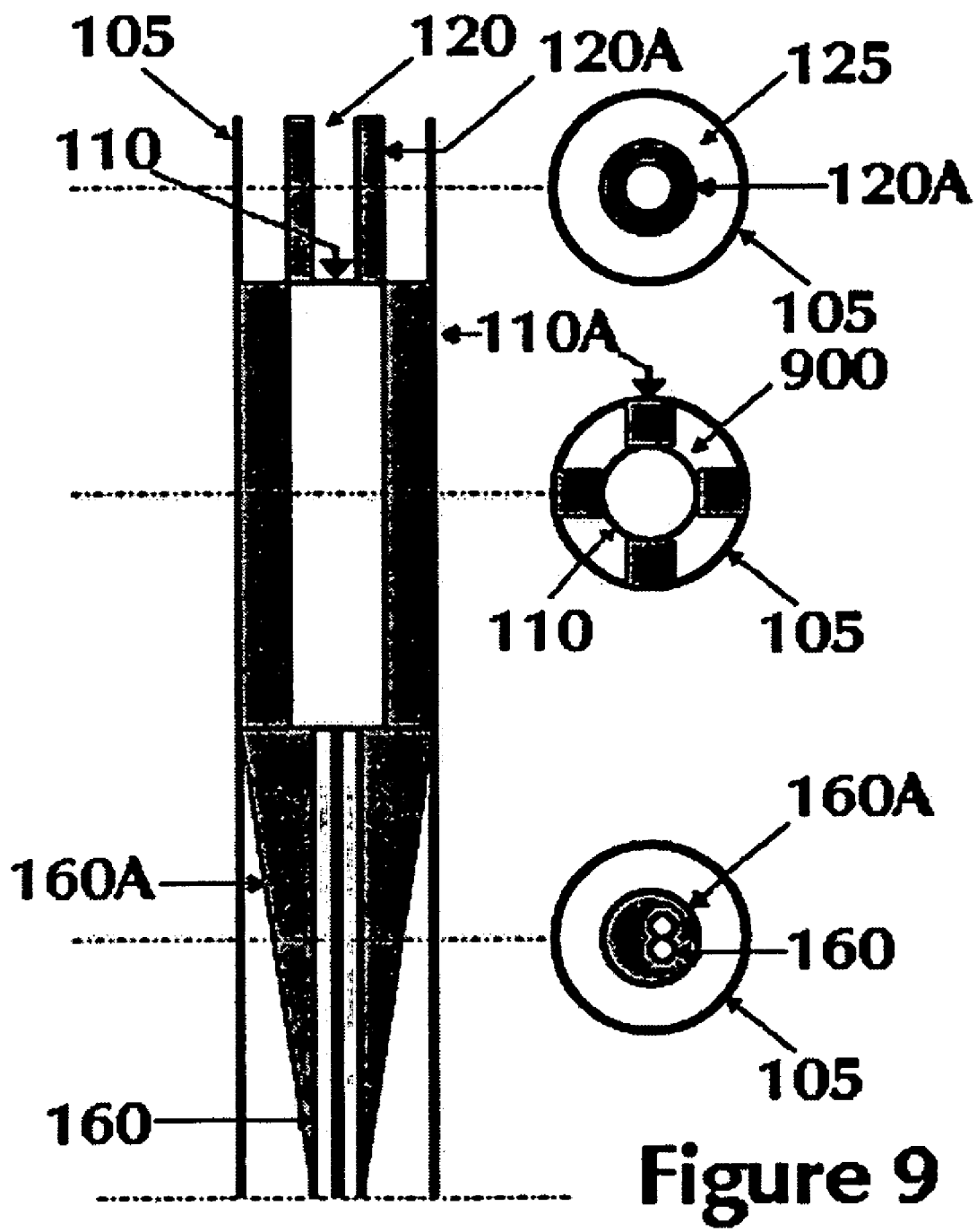
FIG. 9 illustrates an improvement to insulate components of the ground source heat pump systems while also providing a measure of buoyancy, pursuant to the teachings of the present invention.
Figure 10:
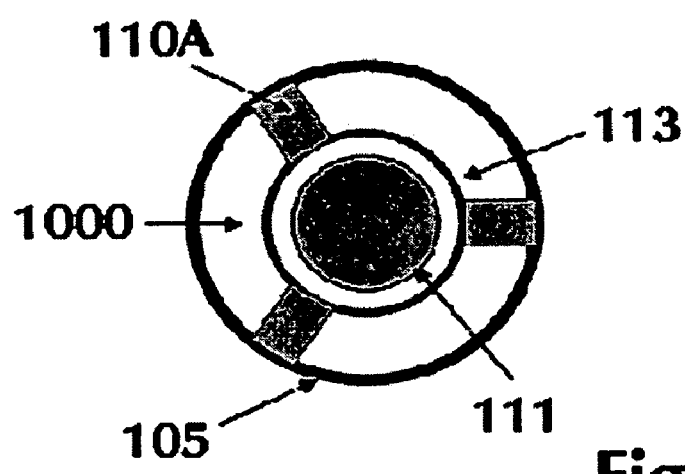
FIG. 10 illustrates a presently preferred configuration of an insulation covering for the pump assembly pursuant to the teachings of the present invention.

With reference now to FIGS. 9 and 10 of the Drawings, there are illustrated further embodiments of the present invention. In particular, various sleeve configurations are demonstrated to thermally insulate the water uptake components from the return water proceeding downhole. Also shown are various cross sections further illustrating the configurations of the insulating components.

Applicant has found that most standing column well designs, i.e., wells incorporating the circulation of the water as described hereinabove, do not consider the heat shunting effects of placing the updraft water from downhole through the pump assembly 110, water discharge line 120 and water intakes lines 160, in close proximity, thermally, to the annular downcoming 125 return water. Thus, Applicant has found that insulation placed around the updraft components reduces the heat losses, particularly toward the top of the well where the temperature gradient is greatest, e.g., along the water discharge line 120 and the housing 113, and where the only deterrent to heat transfer is the thickness of the materials.

For example, at the top of FIG. 9 there is shown a sleeve 120A around the water discharge line 120. As illustrated, the sleeve 120A surrounds the line 120 and prevents heat transfer with the return water being discharged nearby by the water return line 130, illustrated in FIG. 1, thereby minimizing heat transference therebetween and forcing heat transfer of that return water more preferentially with the surrounding well bore 105, as described hereinabove. As seen in cross section, the annulus 125 allows the return water to flow downhole freely without any contact with the water discharge line 120.

In particular, at present, a preferred pump assembly 110 utilizes a 4" dia. 33GS or 40GS submersible pump, with two parallel polypipe lines 160 extending bottomhole from fittings 114 integral to the pump housing 113. It is desirable to minimize heat transfer from the annular (building) 125 return water to the water within the polypipe lines 160. The reason that this is important is that one wants to operate with the maximum $\Delta T$ that the geothermal system will allow, and anything that shunts heat between the upcoming water (supply to the building) and the return water is going to compromise the availability of the system. As noted, this is of increased significance for the top portion of the well, i.e. the pump discharge line 120 and pump housing 113, which first experience heat exchange with the return water. Water at the very bottom of the borehole 105, on the other hand, will be essentially the same temperature outside the polypipe 160, as well as inside. Designs are presented here for each area of unwanted heat exchange: the pump discharge line 120, the pump housing 113, and the polypipe extension lines 160.

With the preferred pump assembly 110, Applicant has performed various experiments. For example, submersible pumps in the range of 33-40 gpm have a 2" NPT female fitting at the top designed to accept a 2" nipple with bayonet end (hose barb) to accommodate a nom. 2" polypipe attachment. The wall thickness for 2" polypipe with an SDR (standard dimension ratio) of 13.5 is 0.176". The thermal conductivity, k, of HDPE (high density polyethylene) is 0.19 BTU/hrft° F. Based on these dimensions and properties, the equivalent R-factor (thermal resistance factor) is computed to be 0.14 hrft° F./BTU. Near the top of the string, the maximum thermal gradient exists, equivalent to the full $\Delta T$ imposed by the building, e.g. 7-8° F. Therefore, the heat exchange between annular 125 return water and the water discharged from the pump 111 (building supply) is 53.6 BTU/hr per foot of length. An 80' discharge line 120, then, would present 4,285 BTU/hr (0.36 tons) of thermal short.

By adding a thickness of flexible, closed-cell foam insulation wrap (k=0.168 BTU/hrft° F.) around the discharge line 120, one can expect to reduce this thermal short accordingly, as noted in the accompanying table:

TABLE 2

| Insulation benefits | |
|---|---|
| Insulation Thickness (in) | Heat Exchange (BTU/hrft) |
| 1/8 | 31.94 |
| 1/4 | 23.36 |
| 3/8 | 18.75 |
| 1/2 | 15.86 |
| 3/4 | 12.42 |

Figure 11:
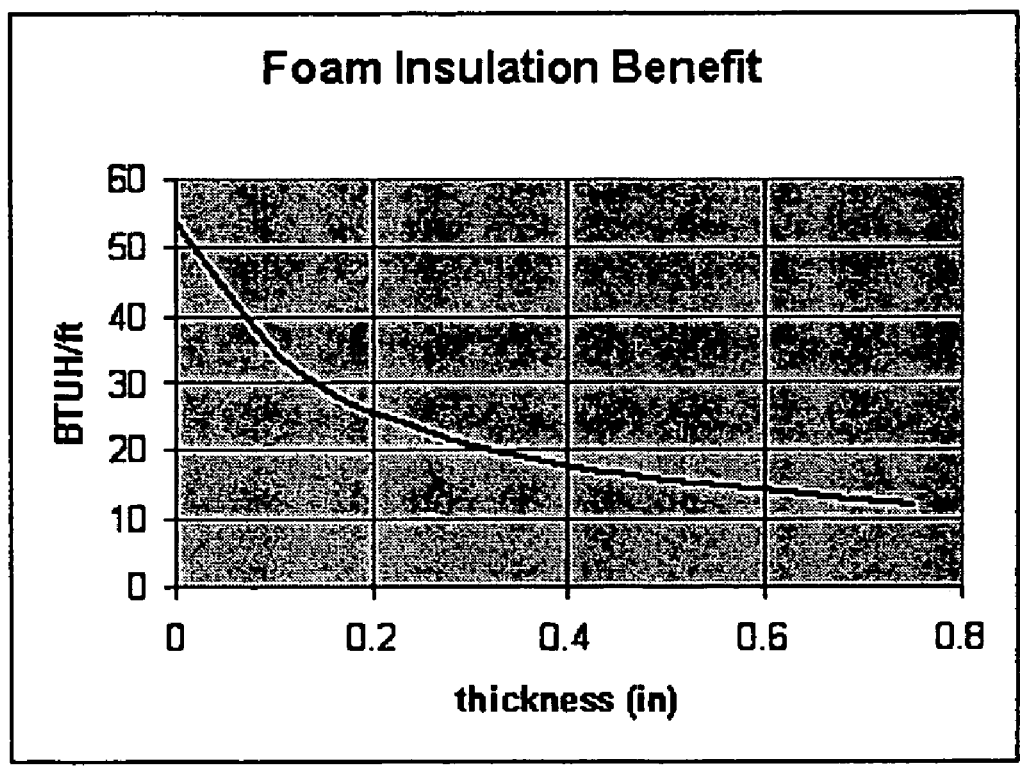
FIG. 11 is a chart illustrating the heat saving benefits due to the use of insulation in the present invention.

Shown in FIG. 11 of the Drawings is a chart of the closed cell Foam Insulation Benefit described hereinabove. As is apparent from the table and by reference to FIG. 11, by adding, for example, a quarter inch of foam insulation, one can save 56% of the heat that would have been shunted across to the discharge water. This forces the heat transfer to occur more at the face of the wellbore 105 rock.

Since only approximately 100' of 2" discharge pipe 120 is typically required in a SCW, the foam insulation could be manufactured in sections, say 9-10' lengths, and pieced together in the field around the polypipe. MAXX-R (www-.MAXX-R.com), for example, is one such manufacturer of underground-pipe foam insulation systems. While MAXX-R intends their insulation to simply slide over the polypipe, this likely will not be sufficient in an underwater environment. The insulation may need to be slit to allow the pipe to enter more easily, and then sealed along the periphery, as is understood in this area.

Another, more effective way, to insulate is to manufacture the foam insulation directly around the polypipe being deployed. A spool of 250', for example, could be run through a die through which the foam is sprayed and cured before then being reeled for transport to the work site.

With further reference to FIG. 9, another sleeve 110A surrounds much of the pump housing 110, such as shown in FIGS. 4 and 7, but with wedged gaps 900 therein to allow water flow therethrough. As seen in cross section, the return water proceeds downward through the gaps 900 and between the sleeve 110A components with minimal contact with the pump assembly 110. It should be understood that alternate configurations of insulation 110A and interspersal of gaps 900 therebetween are possible, so long as adequate passage is made for return water downflow.

With reference now to FIG. 10 of the Drawings, there is illustrated a presently preferred embodiment of the insulating sleeve 110A surrounding the pump assembly 110, particularly, the housing 113. As shown in FIG. 10, the pump 111 (and motor 112) is centrally situated within the housing 113, with a water space therebetween. Outside the housing 113 and engaging the well bore 105 are several flex foam spines 110A. In this embodiment, there are three such spines, instead of the four in the embodiment shown in FIG. 9, since three such members are sufficient for stability. As with the earlier embodiment, gaps 1000 are formed therebetween to allow the return water to flow downhole therethrough.

In particular, with the preferred pump assembly 110, Applicant has also performed experiments on improvements in insulating the housing 113. For example, the pump PVC housing 113 is approximately 36" long to accommodate the total length of the pump 111 and motor 112, plus a small reservoir of water at the bottom of the housing 113. The thermal conductivity of PVC is 0.085 BTU/hrft° F., over a factor of 2× lower than HDPE polypipe. Assuming 4" (nom.) Sch.40 PVC pipe, the Equivalent R-factor is calculated to be 0.208 hrft° F./BTU. The heat exchange between water on the outside and that on the inside, assuming negligible temperature drop at the walls for flowing conditions, is 36.0 BTU/hr per linear foot of housing length. The 3' housing length, then, presents a thermal short of 108 BTU/hr. This is not nearly as significant as the aforementioned polypipe lines, but, since the housing 113 ideally should be secured at the design depth, it is advantageous to include exterior flexible foam insulation around the housing that will achieve various benefits:

Positioning the housing 113 in the wellbore 105 at the design depth via adding a molded flexible foam jacket around the housing 113 with spines that rub against the wellbore 105 allows water to easily flow therethrough.

The outside diameter (OD) of the housing 113 is 4.75" (the top and bottom caps are 5.25" OD) and the wellbore 105 diameter is 6.25". Adding ¼" insulation jacket around the housing 113 will allow a ½" gap or pocket 700 for water to flow between the wellbore 105 and the jacketed housing 113. The molded spines 110A that extend from the housing 113 to the wellbore 105 rock should only contact the wellbore in three or four symmetric lines of contact, so as to minimize flow resistance, as illustrated in FIG. 7.

At ¼" insulation, the heat shunted along the length of the housing 113 is reduced to only 74 BTU/hr, down from 108 BTU/hr.

By adding a cylindrical block of foam insulation under the housing 113 (with an opening allowance for the two polypipe extension lines to pass), the PVC housing, with its specific gravity of 1.4, can be made to be buoyant at the designed depth. The calculated displacement weight needed to balance the PVC housing with end caps in water is approximately 4 lbs [0.1624 cuf×62.4 lb/cuf× 0.4]. With a closed-cell foam density of 2 lb/cuf, the volume needed to suspend the housing in water is V=4 lb/(60 lb/cuf)=0.067 cuf, or 115 cu-inches. A 5" diameter flotation block with a slot cutout to accommodate the twin polypipes has a net area of 12.9 sq-inches. This gives a flotation block depth requirement of 9". Therefore, a 12" block thickness is adequate to support the weight of the housing.

Finally, another sleeve is depicted surrounding the water intake pipe(s) 160. Here the sleeve 160A tapers downward from the pump assembly 110, topside where the insulation is thickest, to the pipe 160 terminus downhole, where the insulation is thinnest. Of course, thermodynamically the insulation along the terminal portions of the pipes 160 is minimal due to the negligible temperature differential. As the water is drawn upward, however, that differential increases, as does the thickness of the insulation. The gradation of the sleeve 160A can be gradual as shown or stepped, e.g., a series of uniform-diameter sleeves tapering downhole. It should be understood that at the point of joinder to the pump housing 110, the sleeve 160A has gaps similar to the gaps 700 shown above to permit the downward flow of the return water.

In particular, with the preferred configurations depicted, Applicant has also performed experiments on improvements in insulating the water intake pipes 160 or polypipes extending downhole to the well bottom. For example, with a system 100 configuration employing twin extension pipes 160, the heat exchange along the length of the polypipe extension lines 160, which may be 800' or more in length, is significant. Without insulation, 1.5" polypipes contribute a total R value of 0.0694 hrft° F./BTU. The ΔT over this length, however, will be less than the building ΔT, because at bottomhole there is no heat transfer from outer to inner, i.e., there are isothermal conditions at the bottom. A conservative estimate of the shunting heat transfer along the polypipe extensions 160 assumes perhaps half of the overall building ΔT. On this basis, the shunting heat transfer along 800' of polypipe lines 160 amounts to 43,248 BTU/hr (3.6 tons), or 20-30% of the heat transfer into the rock. Therefore, it is mandatory to include thermal insulation around the polypipe lines 160. Perhaps, it is not necessary to carry such insulation all the way downhole, because the temperature gradient (outer to inner) decreases the deeper you go and at bottomhole there is no gradient.

Following along the analysis in connection with the water discharge line 120, the following table and graph represent data Applicant has calculated for the total shunting heat exchange along the polypipe lines 160.

TABLE 3

| Shunting heat exchange | |
|---|---|
| Insulation Thickness (in) | Heat Exchange (BTU/hrft) |
| 1/8 | 29.31 |
| 1/4 | 20.83 |
| 3/8 | 16.52 |
| 1/2 | 13.91 |
| 3/4 | 10.87 |

Using ½" insulation, for example, the overall twin polypipe 160 shunting heat transfer would be reduced to 11,128 BTU/hr or less than 1 ton. An optimum design would therefore employ tapered thickness insulation, where the thickest insulation was located at the bottom of the housing and no insulation at the very bottom.

Figure 12:
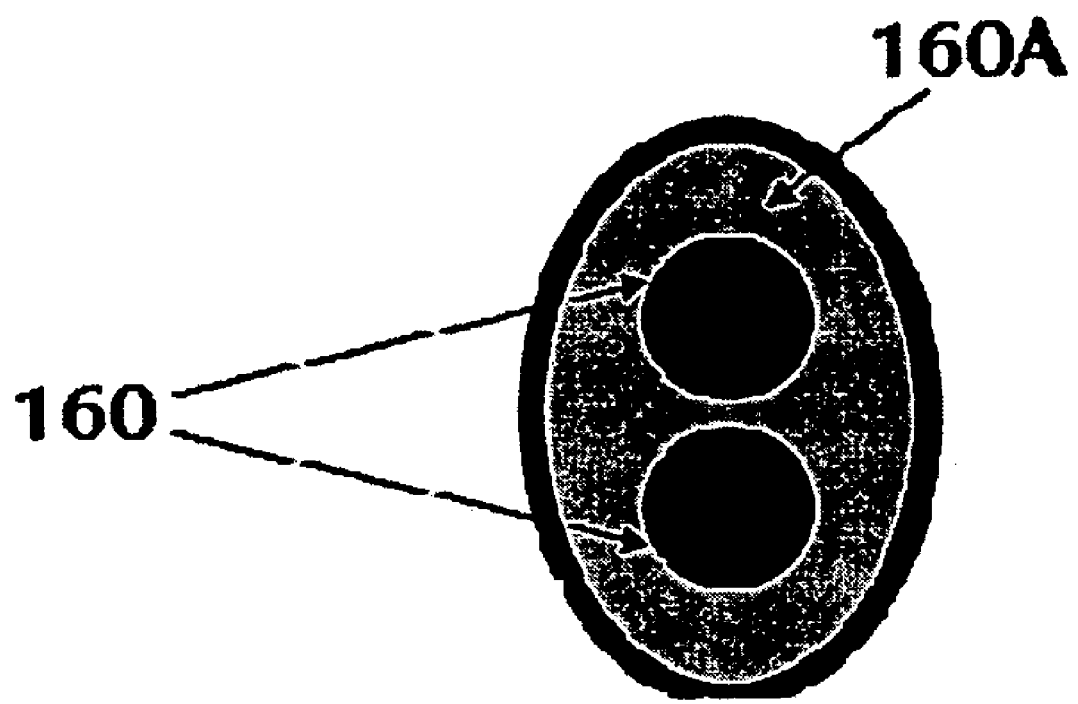
FIG. 12 illustrates a detailed configuration of an insulation covering for the pump assembly pursuant to the teachings of the present invention.

A design using ½" foam sleeve insulation around the twin polypipes is shown in FIG. 12.

As shown in FIG. 9, the sleeve 160A of insulation surrounds the twin water intake pipes 160. Although a circular configuration is shown for simplicity, it should be understood that alternative cross-sectional configurations are possible, e.g., an oval cross section which more evenly distributes insulation about the polypipe extension lines 160. With three or more pipes 160, alternate configurations are possible but circular is generally preferred.

A problem with assembling a nested configuration of two or more lines 160 is being able to get the polypipes into the insulation. One practical solution is to simply mold ⅜" foam around a polypipe 160 as it comes off the reel, such as depicted in FIGS. 2 and 3. As discussed earlier, it is possible to build a die that would center the polypipe 160 and spray the foam insulation from the periphery of the die allowing time to setup and cure, all in a continuous feed.

Although pre-sprayed pipe 160 appears to be the most practical solution due to minimization of deployment time, on-site insulation spraying may be an alternative with longer spools, e.g., 800-foot and 1,000-foot lengths, that cannot be prepared in advance.

In addition to increasing the heat transference, the insulation foam will likely be buoyant, suspending the pump housing 110 at a defined level within the well bore 105, e.g., 80' below water level 180, and facilitating maintenance to the housing 113, as set forth in connection with the embodiment of FIG. 7.

Additional configurations of the insulation may streamline or laminate downward flow or create turbulence along the way. Although a preferred material is foam, it should be understood that numerous other materials and configurations are possible to provide the requisite buoyancy and return water channeling capabilities. Indeed, the floatation insulation, collars or sleeves provide both protection and support for the components as they are drawn up, such as during maintenance, thereby preserving the integrity of the component parts and the system 100 as a whole.

In view of the above description, the various embodiments of the invention set forth herein present a cost-savings approach to deploying a pipe as a pump extension to the hole bottom in a standing column well. These embodiments are based on the use of continuous feed of polypipe from a reel in place of the more common use of PVC sections that require adequate joining every 20' to carry the string load. For larger or deeper wells, this approach also includes the simultaneous deployment of multiple polypipes. The cost savings benefit of the proposed method is a factor of at least 5, making SCW-ground source heat pump systems economically viable.

By use of flotation and insulation collars around the interior components, maintenance of the above deployed systems is made easier, eliminating or minimizing the need for heavy equipment. Improvements in below ground accessways to wellheads further facilitate deployment and maintenance of the systems described herein in various circumstances.

The foregoing description of the present invention provides illustration and description, but is not intended to be exhaustive or to limit the invention to the precise one disclosed. Modifications and variations are possible consistent with the above teachings or may be acquired from practice of the invention. Thus, it is noted that the scope of the invention is defined by the claims and their equivalents.

What is claimed is:

1. A ground water heat transfer system comprising:
   a water pump, said water pump suspended in a well and connected to at least one water intake pipe, said at least one water intake pipe extending downhole substantially to the bottom of said well;
   a heat exchange system, said heat exchange system being connected to said water pump; and
   a return pipe, said return pipe being connected to said heat exchange system and returning water from said heat exchange system to said well,
   wherein said at least one water intake pipe is deployed in said well from a spool and further including a float affixed down hole and adjacent the bottom portion of a housing for said water pump, thereby providing buoyancy.

2. The ground water heat transfer system according to claim 1, wherein said water pump is suspended below the water level in said well.

3. The ground water heat transfer system according to claim 1, wherein said at least one water intake pipe is attached to a weight, wherein said weight, during deployment, guides said at least one intake water pipe substantially to the bottom of said well.

4. The ground water heat transfer system according to claim 1, wherein a bottom portion of said at least one intake water pipe comprises perforations or slits therethrough, allowing water in said well to enter therethrough.

5. The ground water heat transfer system according to claim 4, wherein said bottom portion comprises the bottom 5-10 meters of each said water intake pipe.

6. The ground water heat transfer system according to claim 4, wherein said at least one water intake pipe comprises 2-5 said water intake pipes.

7. The ground water heat transfer system according to claim 6, wherein said plurality of water intake pipes, during deployment, are attached or tied together every 5-15 meters.

8. The ground water heat transfer system according to claim 1, wherein said at least one water intake pipe comprises a polyethylene tube with a diameter of about 1-3 inches.

9. The ground water heat transfer system according to claim 1, wherein said well is a standing column well having a depth of at least 30 meters.

10. The ground water heat transfer system according to claim 9, wherein said well is a standing column well with a depth of from 50 to 300 meters.

11. The ground water heat transfer system according to claim 1, further comprising:
    an insulation sleeve, said insulation sleeve being deployed over downhole components of the ground water heat transfer system, said downhole components being a member of the group consisting of said water pump, a water discharge pipe extending from said water pump to said heat exchange system, and said at least one water intake pipe.

12. The ground water heat transfer system according to claim 11, wherein said sleeves are deployed onto one or more of said downhole components or portions thereof by spraying foam.

13. A ground water heat transfer system comprising:

a water pump, said water pump suspended in a well and connected to at least one water intake pipe, said at least one water intake pipe extending downhole substantially to the bottom of said well;

a heat exchange system, said heat exchange system being connected to said water pump; and a return pipe, said return pipe being connected to said heat exchange system and returning water from said heat exchange system to said well, wherein said at least one water intake pipe is deployed in said well from a spool, and further including a tieline, said tieline affixed at one end thereof to end portions of said at least one water intake pipe, leaving the ends of said at least one water intake pipe open, said tieline affixed at the other end to a weight; and a baffle, said baffle being affixed to said tieline adjacent the ends of said at least one water intake pipe, whereby said baffle protects the ends of said at least one water intake pipe from sediment infiltration.

14. A ground water heat transfer system comprising:

a water pump, said water pump suspended in a well and connected to at least one water intake pipe, said at least one water intake pipe extending downhole substantially to the bottom of said well;

a heat exchange system, said heat exchange system being connected to said water pump; and a return pipe, said return pipe being connected to said heat exchange system and returning water from said heat exchange system to said well, wherein said at least one water intake pipe is deployed in said well from a spool, and including a flotation collar, said flotation collar affixed downhole and adjacent the bottom portion of a housing for said water pump, thereby providing buoyancy.

15. A ground water heat transfer system comprising:

a water pump, said water pump suspended in a well and connected to at least one water intake pipe, said at least one water intake pipe extending downhole substantially to the bottom of said well;

a heat exchange system, said heat exchange system being connected to said water pump; and a return pipe, said return pipe being connected to said heat exchange system and returning water from said heat exchange system to said well, wherein said at least one water intake pipe is deployed in said well from a spool and further including a float located down hole and adjacent a housing for said water pump thereby providing buoyancy.

* * * * *